United States Patent [19]

Oishi et al.

[11] Patent Number: 4,473,854

[45] Date of Patent: Sep. 25, 1984

[54] CASSETTE TAPE RECORDER

[75] Inventors: Kengo Oishi; Osamu Suzuki, both of Kanagawa, Japan

[73] Assignee: Fuji Photo Film Co., Ltd., Kanagawa, Japan

[21] Appl. No.: 406,147

[22] Filed: Aug. 9, 1982

[30] Foreign Application Priority Data

Aug. 20, 1981 [JP] Japan ................................ 56-130615

[51] Int. Cl.$^3$ ........................ G11B 15/52; G11B 27/30
[52] U.S. Cl. ................................................. 360/72.2
[58] Field of Search ................ 360/72.2, 74.4; 369/28, 369/32, 33

[56] References Cited

U.S. PATENT DOCUMENTS

| | | | |
|---|---|---|---|
| 3,171,902 | 3/1965 | Jones et al. | 360/74.4 |
| 4,316,224 | 2/1982 | Hansen et al. | 360/72.2 |
| 4,344,095 | 8/1982 | Furuta | 360/73 |
| 4,363,043 | 12/1982 | Kitamura et al. | 360/72.1 |
| 4,389,685 | 6/1983 | Furuta | 360/72.2 |

Primary Examiner—George G. Stellar
Attorney, Agent, or Firm—Sughrue, Mion, Zinn, Macpeak & Seas

[57] ABSTRACT

A cassette tape recorder is provided with means for recording differently coded address signals on a magnetic recording tape and means for searching the tape for a designated address signal upon reproduction. Before recording a piece of information, an address signal selected in accordance with the kind of information to be recorded is first recorded on one recording track of the recording tape and the piece of information is recorded on the same recording track following this address signal. When the code of the address signal is designated upon reproduction, the recording tape is fed at a relatively high search speed and when one of the address signals having the designated code is picked up, the tape feeding speed is reduced to the reproducing speed to reproduce the piece of information following the address signal. When reproduction of the information is completed and the next address signal is picked up, the tape feeding speed is again changed to the search speed to locate the next address signal having the designated code. All the pieces of information of the desired kind are thus selectively reproduced. In such a cassette tape recorder, the address signal is passed through a low-pass filter when it is recorded and picked up, and the audio signal of the information is passed through a high-pass filter when it is recorded and reproduced.

3 Claims, 3 Drawing Figures

CASSETTE TAPE RECORDER

BACKGROUND OF THE INVENTION

1. Field of the Invention

This invention relates to a cassette tape recorder suitable for reproducing a selected kind of information out of various kinds of recorded information.

2. Description of the Prior Art

Cassette tape recorders are now in wide use, for example in the form of stereophonic cassette decks, portable miniaturized cassette recorders and the like. Among these, portable type cassette recorders are often used to record meetings, conferences, lectures and the like. Further, the portable type cassette recorder can be used as "an audio memorandum" for recording various matters.

When the cassette recorder is used to make a record of a meeting, it is frequently desired to selectively reproduce the words of a specific speaker. On the other hand, when the recorder is used as an audio memorandum for recording various items such as schedules, expenses and the like, it would be convenient to be able to reproduce a selected item out of the recorded items.

Also, in the case of recording different musicians or different kinds of music, many users of tape recorders feel a desire to selectively reproduce the music of a specific musician or of a special kind.

There has been known a method of first recording tunes with spaces left between adjacent tunes and then, in reproducing, to count the number of spaces in order to locate the beginning of a desired tune. However, there has not been known a method of selectively reproducing tunes of desired kind out of randomly recorded tunes of various kinds.

There is disclosed in our U.S. Patent Application Ser. No. 384,808, a cassette tape recorder for selectively reproducing information of a desired kind out of randomly recorded information of various kinds.

The cassette tape recorder of this U.S. Patent application is provided with means for recording differently coded address signals on a magnetic recording tape and means for searching the tape for a designated address signal upon reproduction. Before recording a piece of information, an address signal selected in accordance with the kind of information to be recorded is first recorded on the recording tape and the piece of information is recorded following this address signal. When the code of an address signal is designated upon reproduction, the tape is fed at a relatively high search speed and when one of the address signals having the designated code is picked up, the tape feeding speed is reduced to the reproducing speed to reproduce the piece of information following the address signal. When reproduction of the information is completed and the next address signal is picked up, the tape feeding speed is again changed to the search speed to search for the next address signal having the designated code. All the pieces of information of the desired kind are thus selectively reproduced.

In the address signal recording type cassette tape recorder, generally the address signal is recorded using a recording magnetic head, and is picked up by a reproducing magnetic head. If the address signal and the audio signal of the information are recorded on a single recording track, there arises a problem that when an audio signal resembling the address signal is recorded, the searching means is apt to confuse the audio signal with the address signal. For example, there is a possibility of the audio signal being picked up as an address signal, whereby information not intended to be reproduced is accidentally reproduced, or the possibility of information to be reproduced not being reproduced. Further, if a component of the address signal is mixed with the audio signal, the quality of the reproduced sound is lowered.

SUMMARY OF THE INVENTION

In view of the foregoing observations and description the primary object of the present invention is to provide an address signal recording type cassette tape recorder in which address signals and audio signals of information are recorded on one recording track and which is able to clearly separate the address signal and the audio signal from each other.

In accordance with the present invention, either the address signal or the audio signal is passed through a low-pass filter circuit and the other is passed through a high-pass filter circuit, to be frequency-divided when they are recorded and when they are picked up.

By frequency-dividing the address signal and the audio signal upon recording and picking up them, it is possible to clearly separate them from each other without confusion. Accordingly, such malfunction as described above can be prevented. Further, the possibility of the component of the address signal being mixed with the audio signal to lower the quality of reproduced sounds can be eliminated.

In the address signal recording type cassette tape recorder, the operation of searching the tape for address signals having a designated code is effected by feeding the tape at a higher speed (This speed will be referred to as the search speed hereinafter.) than the tape feeding speed during recording (This speed will be referred to as the recording speed hereinafter.). Therefore, the frequency of the address signal is shifted up, when it is picked up, to the value obtained by multiplying the original frequency at which is was recorded by VB/VA, wherein VA represents the recording speed and VB represents the search speed. Accordingly, the address signal searching operation can be effected more precisely by selecting the filter circuit through which the address signal is to be passed depending on the shift-up of the frequency of the address signal.

Thus, in one preferred embodiment of the present invention, the filter circuit for the address signal is arranged so that the cut-off frequency thereof is set at a first frequency fA when the recorder is set to operate in the recording mode or the reproducing mode, and is set at a second frequency fB when the recorder is set to operate in the address signal searching mode, the second cut-off frequency being of the value obtained by multiplying the first cut-off frequency fA by VBmax/VA (i.e., fB=fA×VBmax/VA). VBmax representing the maximum search speed. Such switching of the cut-off frequency can be easily accomplished by switching the electric circuitry.

DESCRIPTION OF THE PREFERRED EMBODIMENT

Figure 1:
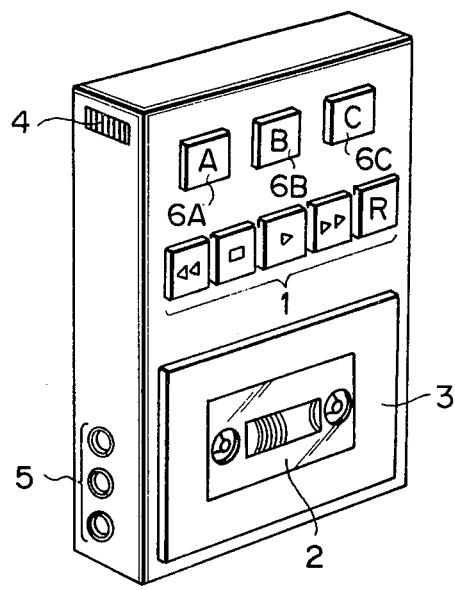
FIG. 1 is a perspective view showing an outside view of a cassette tape recorder in accordance with an embodiment of the present invention.

The cassette recorder in accordance with an embodiment of the present invention shown in FIG. 1 is intended to be used for recording meetings, conferences and the like using a compact type tape cassette, for example. The cassette tape recorder of this embodiment includes control keys 1 and a tape receiving section 3 for receiving a cassette tape 2 disposed on the front face of the recorder body. On one side face of the recorder body are disposed a built-in microphone 4 and input-output terminals 5. On the front face of the recorder body are further disposed three address keys 6A to 6C. When one of the address keys 6A to 6C is depressed upon recording, one of three differently coded address signals is recorded on the recording track of the tape 2 according to the address key depressed.

When one of the address keys 6A to 6C is depressed upon reproduction, the tape 2 is fed at a relatively high search speed for searching the tape 2 for address signals having the code designated by the address key and recorded beforehand (at the time of recording information on the tape) using the address key. When one of the designated address signals is picked up, the tape feeding speed is lowered to the reproducing speed and the information following the address signal is reproduced. This reproduction is continued until an address signal having a different code is picked up. When an address signal having a different code is picked up, the tape feeding speed is again changed to the search speed to locate the next address signal having the designated code.

For example, when recording a meeting, one address key 6A is depressed for a predetermined time interval, e.g., one second, prior to recording each remark of Mr. A, another address key 6B is depressed prior to recording each remark of Mr. B, and the other address key 6C is depressed prior to recording each remark of Mr. C. If the address key 6A is depressed upon reproduction, all the remarks of Mr. A which are respectively accompanied by the address signal recorded using the address key 6A, are selectively reproduced with the remarks of Mr. B and Mr. C not being reproduced. Of course, if the address key 6B is depresed upon reproduction, the remarks of Mr. B are selectively reproduced.

Figure 2:
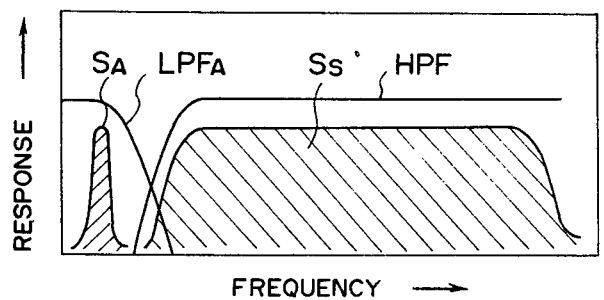
FIGS. 2 and 3 are views for illustrating the effect of the filter circuit employed in the embodiment shown in FIG. 1.

The address signals recorded on the recording track of the tape 2 using the address keys 6A to 6C may comprise one or more signal units having a frequency (e.g., 30 Hz) within a narrow frequency band near the lower limit of the audio frequency region as indicated at SA in FIG. 2. For example, the addres signal recorded by the address key 6A may consist of two repeated signal units SA, the address signal recorded by the address key 6B may consist of three repeated signal units SA, and the address signal recorded by the address key 6C may consist of four repeated signal units SA.

The signal unit SA is passed through a low-pass filter circuit the filtering characteristcs of which are as shown by curve LPFA in FIG. 2 and then inputted into a magnetic head. When the recorder is set in the recording mode, the cut-off frequency of the low-pass filter is set at a first frequency fA. The audio signal SS is passed through a high-pass filter circuit the filtering characteristics of which are as shown by curve HPF and in inputted into the same magnetic head. Though the address signal unit SA and the audio signal SS are recorded on the same recording track by the same magnetic head, each of them is prevented from entering the frequency range of the other to form a noise component since they are respectively passed through the low-pass filter circuit and the high-pass filter circuit to be frequency-divided. Accordingly, by passing the signal picked up by the reproducing magnetic head upon reproduction through a low-pass filter circuit and a high-pass filter circuit respectively having filtering characteristics similar to those shown by the curves LPFA and HPF in FIG. 2, and by picking up the signal passing through the low-pass filter circuit as the address signal and the signal passing through the high-pass filter circuit as the audio signal, the address signal and the audio signal can be clearly separated from each other.

Figure 3:
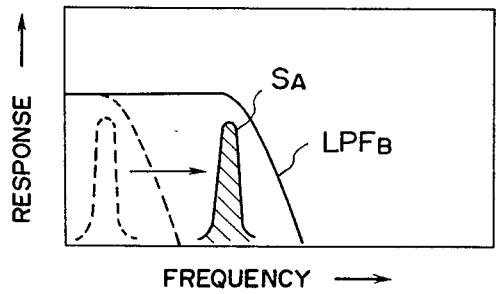

As described above, the frequency of the address signal is shifted up, when it is picked up, to the value obtained by multiplying the original frequency thereof at which is was recorded by VB/VA (FIG. 3), VA representing the recording speed and VB representing the search speed. Accordingly, in this embodiment, when the recorder is set to operate in the address signal searching mode, the cut-off frequency of the low-pass filter circuit is shifted up to a second frequency fB higher than the first cut-off frequency so that the low-pass filter circuit exhibits the filtering characteristics shown by a curve LPFB in FIG. 3. The tape feeding speed during the address signal seaching operation, i.e. the search speed, generally varies, that is, the tape feeding speed during the searching operation increases as the outer diameter of the tape roll wound around the take-up hub is grows larger. The second cut-off frequency fB of the low-pass filter is set at the frequency obtained by multiplying the first cut-off frequency fA by VBmax/VA (i.e., $fB = fA \times VBmax/VA$) wherein VBmax represents the maximum value of the tape feeding speed during the searching operation. By so setting the second cut-off frequency fB, the address signal unit SA can always pass through the low-pass filter irrespective of the shift-up of its frequency. Alternatively, the second cut-off frequency fB of the low-pass filter may be changed continuously of step-wise according to the actual tape feeding speed VB by continuously detecting the tape feeding speed, although this makes the system including the electric circuitry complicated.

Although, in the above embodiment, the addres signal is passed through a low-pass filter with the audio signal being passed through a high-pass filter, the address signal may be passed through a high-pass filter with the audio signal being passed through a low-pass filter. However, in the latter case, the addres signal must inherently have a frequency near the upper limit of the audio frequency region. Then, the amplifier for processing the address signal the frequency of which is shifted up in the address signal searching operation must be adapted to process signals having very high frequency. Such an amplifier is difficult to produce and is expensive.

We claim:

1. A cassette tape recorder comprising means for receiving a magnetic recording tape cassette, recording means, reproducing means, means for feeding the recording tape at a high speed, means for rewinding the recording tape, means for recording differently coded address signals on the audio signal recording track of the recording tape, means for searching the recording tape for address signals having a desired code upon reproduction, and a tape feeding speed control means which controls the tape feeding speed so that the recording tape is fed at a high speed during said search for the address signals having the desired code and is fed at a reproducing speed when one of the address signals having the desired code is located, characterized in that the address signal is passed through one of a low-pass filter circuit and a high-pass filter circuit when it is recorded and picked up, while the audio signal is passed through the other of the low-pass filter circuit and the high-pass filter circuit when it is recorded and picked up.

2. A cassette tape recorder as defined in claim 1 in which said one filter circuit through which the address signal is passed is arranged so that the cut-off frequency thereof is set at a first frequency fA when the recorder is set to operate in the recording mode or the recording mode and is set at a second frequency fB which is of a value obtained by multiplying the first cut-off frequency fA by VBmax/VA when the recorder is set to operate in the address signal searching mode, VA representing the tape feeding speed upon recording and VBmax representing the maximum tape feeding speed during the address signal searching operation.

3. A cassette tape recorder as defined in claim 1 or 2 in which the address signal is passed through the low-pass filter circuit and the audio signal is passed through the high-pass filter circuit.

* * * * *